United States Patent [19]

Peleg et al.

[11] Patent Number: 5,381,533

[45] Date of Patent: Jan. 10, 1995

[54] DYNAMIC FLOW INSTRUCTION CACHE MEMORY ORGANIZED AROUND TRACE SEGMENTS INDEPENDENT OF VIRTUAL ADDRESS LINE

[75] Inventors: Alexander Peleg; Uri Weiser, both of Haifa, Israel

[73] Assignee: Intel Corporation, Santa Clara, Calif.

[21] Appl. No.: 220,391

[22] Filed: Mar. 30, 1994

Related U.S. Application Data

[63] Continuation of Ser. No. 846,257, Feb. 27, 1992, abandoned.

[51] Int. Cl.$^6$ .............................................. G06F 9/38
[52] U.S. Cl. .................................. 395/375; 395/400; 395/425; 364/964.22; 364/964.24; 364/964.26; 364/DIG. 2
[58] Field of Search ...................... 395/375, 400, 425

[56] References Cited

U.S. PATENT DOCUMENTS 5,136,687  8/1992  Johnson ............................. 395/375
5,136,696  8/1992  Beckwith et al. ................... 395/375

OTHER PUBLICATIONS

Minagawa et al., "Pre-decoding Mechanism for Superscalar Architecture," *IEEE Pacific Rim Conference on Communications, Computers and Signal Processing*, May 9–10, 1991, pp. 21–24.

Mike Johnson, *Superscalar Microprocessor Design*, 1991, pp. xxi–xxiv and 57–85.

Ray Weiss, "Third–Generation RIEC Processors," *EDN*, Mar. 30, 1992, vol. 37, No. 7, p. 96(10).

William Stallinga, "Reduced Instruction Set Computer Architecture," *Proceedings of the IEEE*, Jan. 1988, vol. 76, No. 1, pp. 38–55.

Oehler et al., "IBM RISC System/6000: Architecture and Performance," *IEEE Micro*, Jun. 1991, pp. 14–17 and 56–62.

Smith et al, "Boosting Beyond Static Scheduling in a Superscalar Processor," *Proceedings of the 17th Annual International Symposium on Computer Architecture*, IEEE, May 28–31, 1990, pp. 344–354.

*Primary Examiner*—Robert B. Harrell
*Assistant Examiner*—William M. Treat
*Attorney, Agent, or Firm*—Blakely, Sokoloff, Taylor & Zafman

[57] ABSTRACT

An improved cache and organization particularly suitable for superscalar architectures. The cache is organized around trace segments of running programs rather than an organization based on memory addresses. A single access to the cache memory may cross virtual address line boundaries. Branch prediction is integrally incorporated into the cache array permitting the crossing of branch boundaries with a single access.

19 Claims, 4 Drawing Sheets

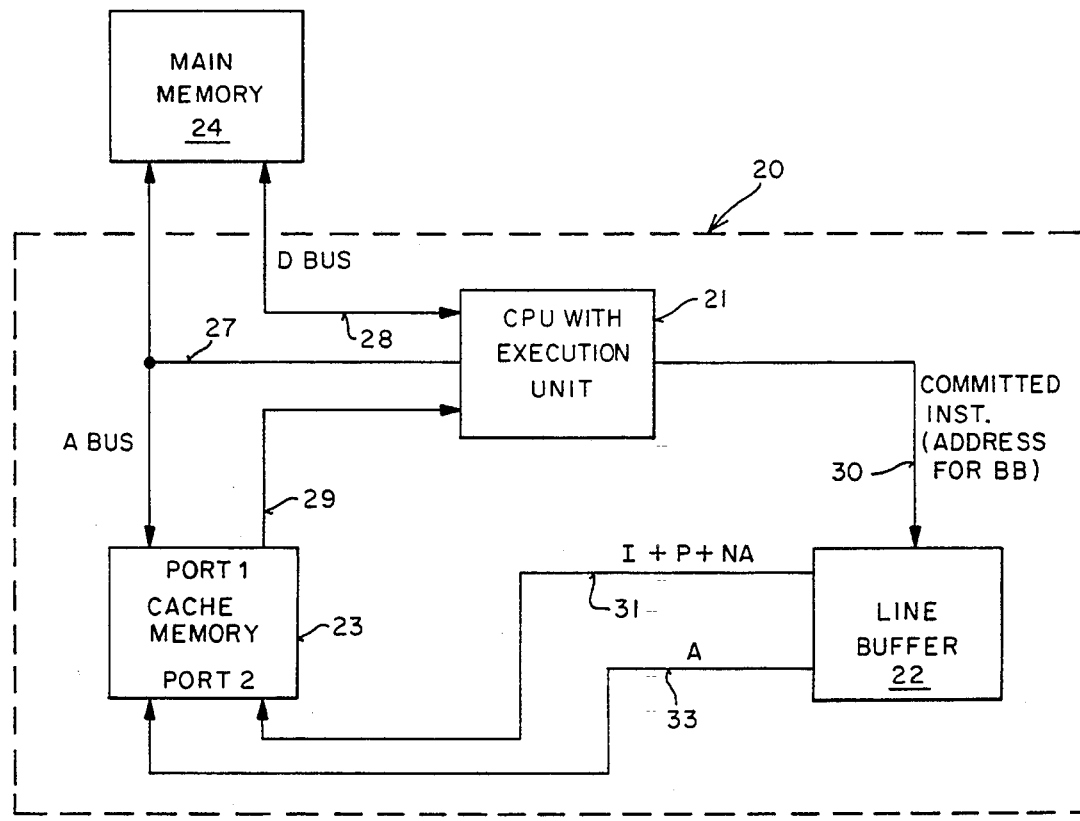
FIG_1
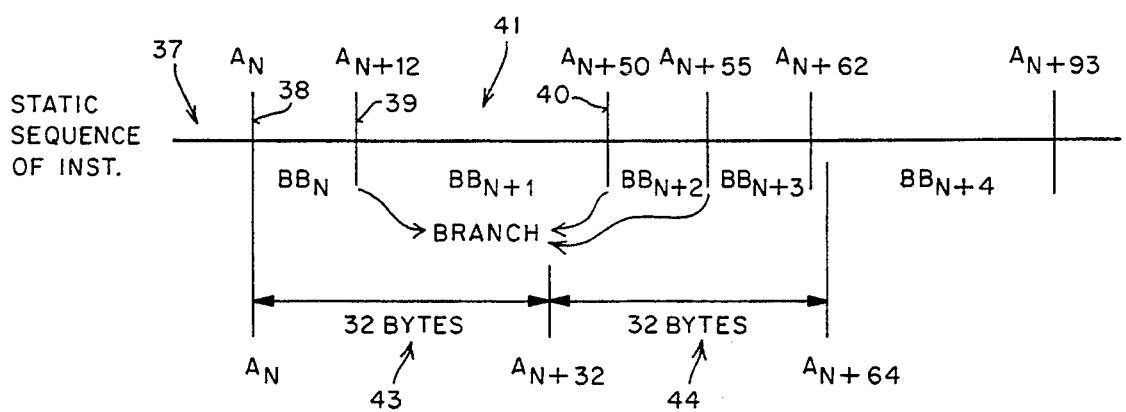
FIG_2

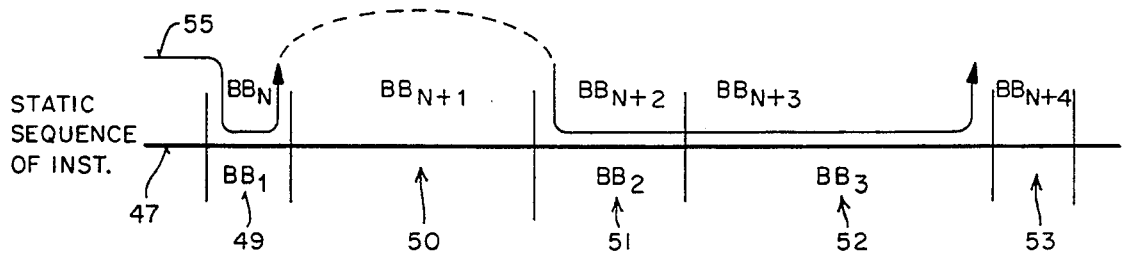
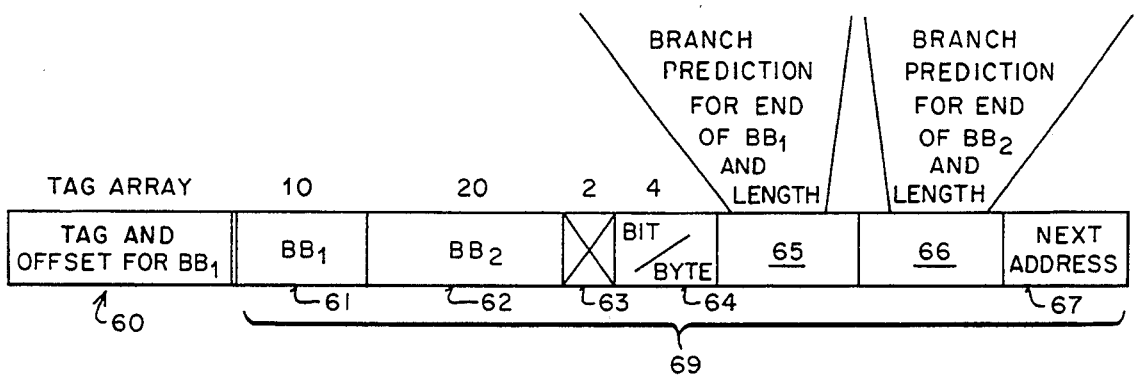
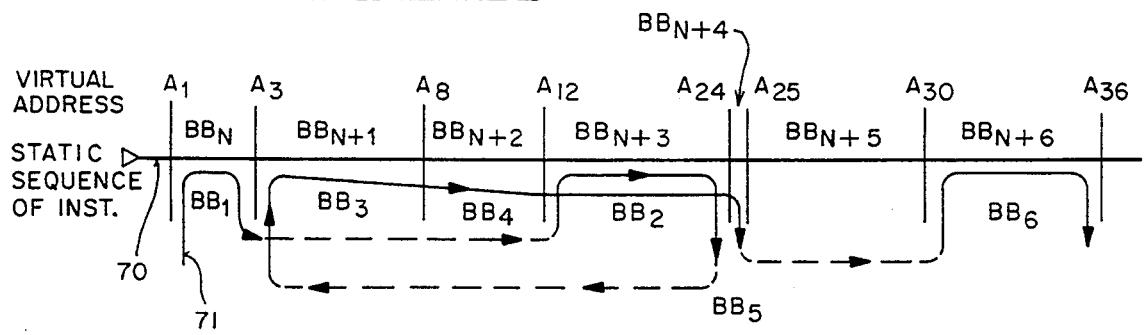

FIG_6
| TAG & OFFSET | INST. | NA |
|---|---|---|
| — | — | — |
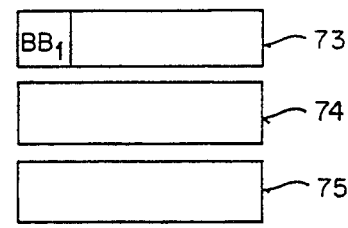
FIG_7
| TAG & OFFSET | INST. | NA |
|---|---|---|
| — | — | — |
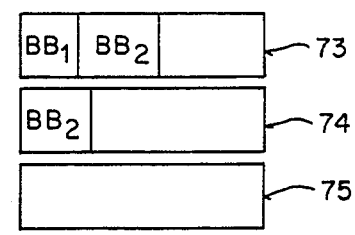
FIG_8
| TAG & OFFSET | INST. | NA |
|---|---|---|
| $A_1$ | $BB_1$  $BB_2$ | $A_3$ |
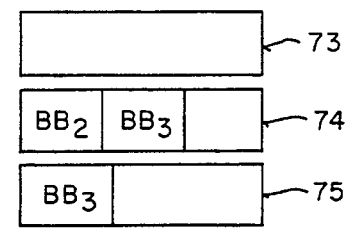
FIG_9
| TAG & OFFSET | INST. | NA |
|---|---|---|
| $A_1$ | $BB_1$  $BB_2$ | $A_3$ |
| $A_{12}$ | $BB_2$  $BB_3$ | $A_8$ |
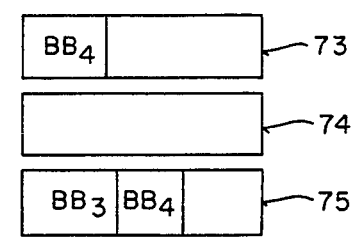

FIG_10
| TAG & OFFSET | INST. | NA |
|---|---|---|
| $A_1$ | $BB_1$ $BB_2$ | $A_3$ |
| HIT → $A_{12}$ | $BB_2$ $BB_3$ | $A_8$ |
| $A_3$ | $BB_3$ $BB_4$ | $A_{12}$ |
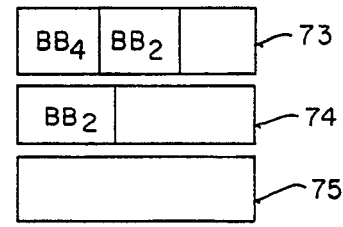
FIG_11
| TAG & OFFSET | INST. | NA |
|---|---|---|
| $A_1$ | $BB_1$ $BB_2$ | $A_3$ |
| $A_{12}$ | $BB_2$ $BB_3$ | $A_8$ |
| $A_3$ | $BB_3$ $BB_4$ | $A_{12}$ |
| $A_8$ | $BB_4$ $BB_2$ | $A_{24}$ |
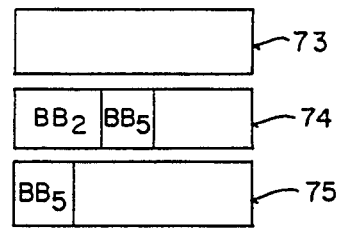
FIG_12
| TAG & OFFSET | INST. | NA |
|---|---|---|
| $A_1$ | $BB_1$ $BB_2$ | $A_3$ |
| REPLACED → $A_{12}$ | $BB_2$ $BB_5$ | $A_{30}$ |
| $A_3$ | $BB_3$ $BB_4$ | $A_{12}$ |
| $A_8$ | $BB_4$ $BB_2$ | $A_{24}$ |

DYNAMIC FLOW INSTRUCTION CACHE MEMORY ORGANIZED AROUND TRACE SEGMENTS INDEPENDENT OF VIRTUAL ADDRESS LINE

This is a continuation of application Ser. No. 07/846,257, filed Feb. 27, 1992, now abandoned.

BACKGROUND OF THE INVENTION

1. Field of the Invention

The invention relates to the field of cache memories, particularly instruction cache memories.

2. Prior Art

For many years digital computers have used cache memories for storing instructions. Typically, these memories use faster static memories as compared to the slower dynamic memories used for the computer's main memory. Through use of well-known mechanisms, such as replacement algorithms, a relatively small cache memory (compared to the size of the main memory) provides a relatively high hit rate and consequently speeds up the flow of instructions to the execution unit of the computer.

Most often an execution unit of a central processing unit (CPU) fetches each instruction from the cache memory by addressing the cache memory with a physical or virtual address. If the instruction is found in cache memory (hit) the instruction is provided to the execution unit directly from the cache memory. There is often a one-to-one relationship between each address from the execution unit and an instruction from the cache memory. This is discussed in more detail in the Detailed Description of the Invention.

If the instruction requested by the execution unit is not found in the cache memory (miss), the physical address or the virtual address after translation to physical address accesses the main memory. An entire line of instructions (as determined by address) which includes the requested instruction is transferred from main memory into the cache memory and the requested instruction is sent to the execution unit of the CPU. Cache memories are typically organized by these lines with the tag and index bits of the address pointing to the entire line of instructions and with the offset bits selecting instructions from within the line.

As will be seen, the present invention provides a method for organizing instructions in a cache memory which departs from the prior art as is discussed in the Detailed Description of the Invention. As will be seen with the present invention, the lines of cache memory do not necessarily store instructions organized by their addresses, rather traces of instructions as defined by the running program determine what is put in each line of cache memory. The integration of branch prediction data into the cache memory allows, in a single access, the crossing of branch boundaries with the present invention. Consequently, a plurality of instructions including instructions crossing a predicted branch boundary may be fetched from the cache memory with only one address/access.

SUMMARY OF THE INVENTION

A method and apparatus is described for storing data in a cache memory. The method comprises the steps of identifying trace segments of instructions in a computer program in the order that they are executed. Once these trace segments are identified, the cache is organized based on these trace segments. Most typically, each instruction trace segment comprises blocks of instructions, the first instruction of each block being one which follows a branch instruction and the last instruction of each block being a branch instruction. The trace segment is associated in the cache memory with the address of the first instruction in the trace segment. The offset bits are used along with the tag bits in the tag array to locate the first instruction of each trace segment in the cache memory since the trace segment may not begin on a line boundary.

In the currently preferred method and apparatus, a trace segment comprising two blocks is stored in each line of cache memory along with branch prediction data and the address for the next instruction trace segment predicted to be executed based on the branch prediction data. Other data is stored for each line as will be described in the Detailed Description of the Invention.

BRIEF DESCRIPTION OF THE DRAWINGS

FIG. 1 is a block diagram showing the cache memory of the present invention with its accompanying line buffer connected to a CPU and main memory.

FIG. 2 is a diagram used to describe a static sequence of computer program instruction and the branching that occurs in the sequence.

FIG. 3 illustrates a sequence of computer program instructions and the control flow changes that occur at branches.

FIG. 4 illustrates a line of cache memory and the data stored for the line in accordance with the currently preferred method and embodiment of the present invention.

FIG. 5A illustrates a static sequence of computer program instructions and the flow that may occur during execution of the instructions.

FIG. 5B illustrates the order of execution of blocks of the instruction for the flow of FIG. 5A.

FIG. 6 illustrates the contents of the line buffer of FIG. 1 and the contents of the cache memory of FIG. 1 after the first block of instructions of FIG. 5A has been executed.

FIG. 7 illustrates the contents of the line buffer of FIG. 1 and the contents of the cache memory of FIG. 1 after the second block of instructions of FIG. 5A has been executed.

FIG. 8 illustrates the contents of the line buffer of FIG. 1 and the contents of the cache memory of FIG. 1 after the third block of instructions of FIG. 5A has been executed.

FIG. 9 illustrates the contents of the line buffer of FIG. 1 and the contents of the cache memory of FIG. 1 after the fourth block of instructions of FIG. 5A has been executed.

FIG. 10 illustrates the contents of the line buffer of FIG. 1 and the contents of the cache memory of FIG. 1 after the fifth block of instructions of FIG. 5A has been executed.

FIG. 11 illustrates the contents of the line buffer of FIG. 1 and the contents of the cache memory of FIG. 1 after the sixth block of instructions of FIG. 5A has been executed.

FIG. 12 illustrates the contents of the line buffer of FIG. 1 and the contents of the cache memory of FIG. 1 after the seventh block of instructions of FIG. 5A has been executed.

DETAILED DESCRIPTION OF THE INVENTION

A dynamic flow instruction cache memory, its organization and method of operation are described. In the following description, numerous specific details are set forth such as specific number of bits in order to provide a thorough understanding of the present invention. It will be obvious to one skilled in the art that the present invention may be practiced without these specific details. In other instances, well-known methods and structures are not described in detail in order not to unnecessarily obscure the present invention.

Departure of the Present Invention from the Prior Art

Typical prior art instruction cache memories are organized by lines, each of which stores a predetermined number of bytes corresponding to a line of virtual address from a program. For instance, in some microprocessors, 32 bytes are stored on each line of cache memory. Each line in cache memory is associated with the virtual addresses of the instructions in that line. The tag and index bits locate an entire line in cache memory with the offset bits used to select particular fields from each line when a hit occurs. When a miss occurs, an entire line of instructions which contains the requested instruction is fetched from main memory and written into cache memory. Often in a computer program, a line of instructions as defined by virtual addresses, contains several branch instructions. With prior art instruction cache memories, when a branch is taken, the next requested instruction may be on another line. Therefore, some of the instructions stored in the cache memory may never be used and moreover, the organization on each line is independent of branching. In contrast, with the present invention, the organization of the cache memory is dynamically built on the order of execution of the instructions. Considering that in a computer program it is not uncommon to find that every fifth or sixth instruction is a branch instruction, it can be important to mitigate the diversions caused when a branch is taken.

The present invention differs from the prior art cache memories also in the way instructions are fetched from the cache memory. With the prior art cache memories, there is a one-to-one relationship between the addresses and instructions. That is, the execution unit of the CPU provides an address and generates a cache access for each instruction it requests. Newer designs of prior art caches provide in one access, a predetermined number of sequential instructions from the cache line, per one address supplied by the execution unit of the CPU. Typically, taken branch instructions will be in the instructions provided in response to the access. In the case that a taken branch instruction is not the last instruction provided, the instructions following the taken branch were futilely supplied, because they will not be executed. Therefore, the number of access to the cache memory is a limiting factor in determining the rate at which instructions may be fed to the CPU. As will be seen with the present invention, the instructions are organized in trace segments, each of which comprises basic blocks of instructions. As will be described, the instructions in the basic blocks are supplied to the CPU after the first instruction in the block is addressed (without addressing the other instructions in the line) since it is known that the other instructions in at least one of the blocks will be requested. Moreover, since branch prediction data is stored with each block, instructions crossing taken branch boundaries from several blocks can be used without an additional address access from the CPU.

Basic Blocks and Trace Segments of Instructions used in the Present Invention

In accordance with the present invention, storage in the cache memory is organized around basic blocks of instructions on a first level and then on trace segments of instructions comprising a plurality of such blocks on a second level.

A basic block comprises instructions in a computer program which are unconditionally and consecutively executed. A basic block starts with the first instruction following a branch instruction and its last instruction is a branch instruction. (Branch instructions include both unconditional branches (e.g., call, return) and conditional branches.) There are no instructions in the basic block, the execution of which may change the control flow in the program. Once the first instruction in a basic block is executed, all the remaining instructions in the basic block will for certain be executed since there is no instruction in the block that goes beyond a branch instruction.

In FIG. 2, a static sequence of instructions is illustrated along the line 37. The instructions are ordered by their virtual addresses. For purposes of discussion, assume that $A_N$ is the virtual address for an instruction 38 and that instruction 38 is a branch instruction. Further assume that a plurality of instructions lie between the addresses $A_N$ and $A_{N+12}$ and that these are instructions which will be executed once instruction 38 is executed since they contain no branch instructions. The instruction at the address $A_{N+12}$, instruction 39, is assumed to be the next branch instruction in the sequence of instructions. A basic block ($BB_N$) starts with the instruction following instruction 38 and ends with instruction 39. The next branch instruction in the sequence of instruction is instruction 40 at address $A_{N+50}$. A basic block ($B_{BN+1}$, numbered 41,) starts with the instruction following instruction 39 and ends with instruction 40. If we assume that branch instructions on the remainder of line 37 only occur at $A_{N+55}$, $A_{N+62}$ and $A_{N+93}$ then additional basic blocks $BB_{N+2}$, $BB_{N+3}$ and $B_{BN+4}$ are shown on line 37. The basic blocks are numbered $BB_N$, $BB_{N+1}$, $BB_{N+2}$ . . . to indicate the order of the blocks in the static program. As will be seen later, the blocks are numbered $BB_1$, $B_2$, $BB_3$ . . . to indicate the order in which they are executed.

As mentioned, basic block begins with the first instruction which follows a branch instruction and end with a branch instruction. Note that the branch instruction itself is unconditionally executed; what is not certain is which instruction will be executed following the branch.

If it is assumed that a typical prior art cache memory stores 32 bytes in each line, and that the line begins with the address $A_N$, two such lines 43 and 44 are also shown in FIG. 2. Note that lines 43 and 44 each contain branch instructions and that the boundary between these lines ($A_{N+32}$) is not coincident with a basic block boundary. There is not necessarily any correlation between basic blocks and the instruction in a prior art line of cache memory.

In FIG. 3, another static sequence of instructions are shown along line 47. The instructions along line 47 are similarly arranged to those along line 37 of FIG. 2, with basic blocks 49 ($B_{BN}$), 50 ($B_{BN+1}$), 51 ($BB_{N+2}$), 52 ($BB_{N+3}$) and 53 ($BB_{N+4}$) being shown. These basic blocks are again numbered $B_N$, $B_{N+1}$, $B_{N+2}$ to indicate their virtual address order as they appear in the program. While it is certain that once the first instruction in a basic block is executed, the remaining instructions will be executed, there is no certainty that once, for instance, basic block 49 is executed that basic block 50 will follow because of the branch instruction between them.

Trace 55 of FIG. 3 shows what may occur in the execution of a typical computer program. If we assume that basic block 49 ($BB_1$) is executed and at the end of this basic block, a branch is taken to the basic block 51 ($BB_2$) the basic block 50 is skipped. If at the end of $BB_2$ the branch is not taken, basic block 52 ($BB_3$) is next executed. The order of execution therefore, of the basic blocks $BB_1$, $BB_2$, and $BB_3$ is not the same as their virtual address order.

Overall Structure of the Present Invention

Referring now to FIG. 1, a computer 20 is illustrated which is coupled to a main memory 24 through a data bus 28 and address bus 27. The computer 20 includes a central processing unit (CPU) 21. The CPU 21 may be an ordinary CPU well-known in the art which includes an execution unit for executing instructions. The cache memory of the present invention is particularly useful when the CPU 21 employs superscalar architecture which may speculatively and simultaneously execute a plurality of instructions out-of-order. In such CPUs at some stage in the processing, there is a commit mechanism that determines which ones of the speculatively executed instructions were in fact needed. The commit mechanism organizes the output of the computer such that the output is oblivious of the out-of-order execution and devoid of the unneeded executions, which may have occurred during the speculative executions of instructions beyond mispredicted branches. Bus 30 of FIG. 1 represents an output of the CPU 21 which provides executed instructions and their address. (As used in this specification, the term "executed" refers to instructions the execution of which was needed, as opposed to speculatively executed instructions which were not needed.) The precise information provided on bus 30 will be apparent from the description of the line buffer 22.

The cache memory 23 may employ ordinary cache memory circuitry such as static memory cells. In the currently preferred embodiment, the memory 23 is a dual port memory having a tag array, cache instruction storage section and other sections for storage as will be described. One port of the memory 23 is accessed by addresses on bus 27 with instructions and other data from the cache memory coupled to the CPU 21 on bus 29. The other port of the cache memory 23 is accessed by addresses on bus 33 with instructions and other data stored in the cache memory being coupled to the cache memory from the line buffer 22 over bus 31. In general, the data coupled on bus 31 comprises the instruction blocks organized by traces ("I"), branch prediction data ("P") and the next address ("NA") all illustrated in FIG. 1 by "I+P+NA".

It should be noted in FIG. 1 that in the currently preferred embodiment, instructions are not coupled to the cache memory directly from the main memory 24. Rather, all cache memory inputs are from the line buffer 22. Therefore, only instructions which have been executed by the CPU 21 are coupled to the cache memory 23 for storage.

In the currently preferred embodiment the cache memory 23 has a set associativity of four or greater.

With the preferred embodiment of the present invention, the first instruction for each executed basic block is addressable by the CPU. As illustrated in FIG. 2, there can be close static address mapping for the basic blocks and therefore, for the first instruction in each block. Specifically, as shown in FIG. 2, the first instruction of several blocks can be mapped into the same index, thus a higher associativity is used to enable hits for these close static addresses.

The data stored in the cache memory generally referred to as I+P+NA is organized within the line buffer 22. The line buffer 22 contains three lines of data, the content and operation of which is described in detail in conjunction with FIGS. 6-12. The physical construction of the line buffer 22 may employ ordinary circuits.

Organization of Data in the Cache Memory In Accordance with the Present Invention FIG. 4 shows a single line of cache memory with the data stored in this line in accordance with the present invention. A cache memory contains many such lines, for example, 1024 lines each storing 32 bytes of instructions plus other data. Each line of instructions is associated with an address which includes a tag field stored in a tag array as is typically the case with prior art cache memories. However, with the present invention the offset bits are also stored in the tag array. By way of example, the tag and offset bits for the first instruction in $BB_1$ are stored in the tag array as shown by field 60. The tag and offset bits of an address from the CPU or line buffer are compared to the tag and offset bits in the tag array. The offset bits are needed in the tag array since the address of the first instruction of $BB_1$ may not fall on a memory line boundary.

The first field 61 stored in the line 69 of FIG. 4 is the basic block $BB_1$. For purposes of discussion, it is assumed that $BB_1$ is 10 bytes wide. The next field 62 stored in the line 69 of cache memory is the $BB_2$ which is assumed to be 20 bytes wide. In the execution of a computer program, $BB_2$ was the block of instructions which was actually executed following the execution of the instructions in $BB_1$. This is illustrated in FIG. 3 by the trace 55. Field 63 of the line of data comprises two bytes which, for the illustrated example, contain no valid data. If we assume that the line 69 of cache memory has the capacity to store 32 bytes of instruction and further, that at most, two basic blocks are stored per line, then there are 2 bytes of memory not used for the particular example shown in FIG. 4. In fact, in the currently preferred embodiment of the present invention, at most two basic blocks are stored per line of cache memory. Only the first block in any given line is addressable in the ordinary sense through association with the address of its first instruction. (It is believed that two or three blocks per line are most useful for the described cache memory although, in theory, any number of blocks per line may be stored).

The remaining data stored in line 69 includes the fields 64, 65, 66 and 67 shown in FIG. 4 discussed below; other well-known data such as valid bits not shown and those bits associated with replacement algorithms may also be stored but are not shown in FIG. 4.

The currently preferred embodiment of the invention is used with the "X86" instruction set. This instruction set has instructions of variable lengths although all the instruction boundaries fall on byte boundaries. The field 64 stores one bit of data for each instruction byte stored in the line 69. For the illustrated example, where 32 bytes of instruction are stored in a line, field 64 is 4 bytes wide. Each bit in field 64 is used to indicate the boundaries for the instructions. For instance, if $BB_2$ contains six instructions which begin at bytes 11, 12, 18, 19, 25 and 30 then, bits 11, 12, 18, 19, 25 and 30 in the 32 bits of field 64 will indicate an instruction boundary. The data in the field 64 is determined by the CPU 21 since the instructions are decoded for execution. This data is coupled to the cache memory 23 through the line buffer 22. When instructions are read from cache memory by CPU 21, this data is coupled to the CPU and enables quicker execution of the code since the CPU 21 does not have to determine the instructions' boundaries. Note the field 64 is not needed where, as is often the case, the instructions are of the same length.

The field 65 contains the branch prediction data for the branch instruction which is at the end of $BB_1$ and data to indicate the length of $BB_1$. Similarly, the field 62 contains the branch prediction data for the branch instruction at the end of $BB_2$ and data to indicate the length of $BB_2$. The branch prediction information may be the ordinary history bits (e.g., 4 bits) indicating whether the branch is taken or not taken, or a single bit may be used for each of the blocks to indicate whether a branch is taken or not. If the 4 history bits are used, a hard-wired shift register may be used for each line in the cache memory to keep track of the history bits. The branch prediction data is coupled to the cache memory from the line buffer 22. The CPU 21 provides this information over the bus 30.

The field 67 contains the address for the basic block which is predicted to be used next. For instance, referring to FIG. 3, if the branch prediction data indicates that $BB_3$ (see FIG. 3) is to follow $BB_2$, then field 67 will contain the address for the first instruction in $BB_3$.

If a particular basic block has more than 32 bytes (for the illustrated example), the next address field 67 identifies the line in cache memory which contains the next instruction in the basic block. For instance, if a basic block has 50 bytes, the next address points to the line storing the remaining 18 bytes.

In operation, assume that the CPU 21 of FIG. 1 requests the first instruction of BB1. A hit occurs and the cache memory begins transferring to the CPU 21 all the instructions in the line beginning with $BB_1$. These instructions are provided without additional addresses/accesses from the CPU since it is certain that once the first instruction in $BB_1$ is requested the other instructions in at least $BB_1$ will be needed.

If the CPU determines that at the end of $BB_1$ the branch is taken, as illustrated in FIG. 3, then the CPU continues to execute the remaining instructions in the line ($BB_2$). If the CPU implements, for example, out-of-order execution of multiple instructions, it can start executing instructions from and speculatively start executing predicted instructions from $BB_2$. When the CPU determines that the branch at the end of $BB_1$ was predicted correctly, it decides that the instructions speculatively executed from $BB_2$ are valid. Note that the branch prediction data from field 65 lets the CPU know that the block following $BB_1$ is the one for the "branch taken" condition. Thus, the CPU can continue to consume instructions in this second block without addressing this block. It is the storage of the prediction data that allows transition from one block to another even when the block crosses ordinary memory line boundaries. The length data in the field 66 lets the CPU know how many bytes in the line are valid and prevents the execution of invalid instruction from field 63.

If the branch was not taken at the end of $BB_1$, although predicted taken CPU 21 would know not to use the code following $BB_1$. Again, the prediction data from field 65 allows this to be determined. In this case the length data for $BB_1$ from field 65 points to the end of valid instructions in the transfer of the line of cache memory to the CPU. The CPU 21 in this case fetches $BB_{N+1}$.

If $BB_2$ is executed by the CPU 21, then the next address selects $BB_3$ for transfer to the CPU. Again, the branch prediction data is used. Here the data from field 66 tells the CPU that $BB_3$ is being transferred next. If the branch was not taken as predicted, $BB_3$ is used by the CPU. If at the end of $BB_2$ the branch is taken, the CPU 21 discards $BB_3$, discontinues the transfer of instructions from the line containing $BB_3$, (if the transfer is not complete) and seeks the correct instruction from the cache memory or main memory.

Operation of CPU, Line Buffer and Cache Memory

Referring now to FIG. 5A, another static sequence of instructions is shown along line 70. A plurality of basic blocks are identified along the line 70 beginning with $BB_N$ through $BB_{N+6}$. Again, these are the basic blocks along the static sequence of instructions as they appear sequentially based on their virtual address, not their order of execution. The address of the first instruction in each of the blocks is shown. For instance, the address of the first instruction in $BB_{N+2}$ is $A_8$. This instruction is the instruction which follows a branch instruction.

Assume that the program represented along line 70 is executed by the computer of FIG. 1 and that the trace of instructions that results is shown by the line 71. More specifically, the first block executed is $BB_N$ ($BB_1$). The branch at the end of this block is taken and the next block executed is $BB_{N+3}$ beginning at $A_{12}$ ($BB_2$). At the end of this block the branch is taken and $BB_{N+1}$ is next executed ($BB_3$). At the end of $BB_3$ the branch is not taken and $BB_4$ is executed. At the end of $BB_4$ the branch is not taken and $BB_2$ is again executed. This time, at the end of $BB_2$, the branch is not taken and $BB_5$ is executed. At the end of $BB_5$ the branch is taken and $BB_6$ is executed. The order of execution is shown in FIG. 5B, specifically $BB_1$, $BB_2$, $BB_3$, $BB_4$, $BB_2$, $BB_5$ and $BB_6$.

The instructions contained in the line buffer 22 and their transfer to the cache memory 23 for the trace of FIG. 5B is shown in FIGS. 6–12. The other data stored with the instructions (e.g., addresses, bit/byte data, etc.) is not shown in order not to overly complicate the figures, however, this other data is discussed below.

Assume that the CPU 20 of FIG. 1 begins the execution of the program shown along 70 by requesting the instruction stored at $A_1$. Assuming that the cache memory is empty/invalid, a miss occurs when $A_1$ is communicated to the cache memory 23 and the instruction is obtained from main memory 24. (The conversion from virtual to physical address is ignored for purposes of explanation, as well as the fact a line of instructions may be sent to the CPU 21 upon requesting the instruction stored at the virtual address $A_1$). The other instructions in $BB_1$ are similarly not found in cache memory and obtained from the memory 24 and executed. Typically the CPU 21, particularly if it is doing speculative executions, will be obtaining the instructions in $BB_{N+1}$ and $BB_{N+2}$, etc. and begun execution of these instructions in an out-of-order basis.

When the branch instruction at the end of $BB_1$ is reached, the branch is taken and the instruction located at $A_{12}$ is obtain from main memory 24 since it is not in cache memory. At this point, the CPU 21 has identified a basic block since it reached a branch instruction. Moreover, when all instructions in the basic block finish execution, the CPU can commit to this block. The instructions in $BB_1$ are communicated to the line buffer 22 and stored in the first line 73 of the buffer as shown in FIG. 6. The address associated with the first instruction of this block is also stored in the buffer, although not specifically shown in FIG. 6. At this time no information is transferred to the cache memory.

Even though the CPU 21 may have completed the execution of $BB_{N+1}$ since the branch at the end of $BB_1$ was taken, $BB_{N+1}$ is not communicated to the line buffer. Rather, after $BB_2$ is executed, it is communicated to the line buffer 22. This block of instructions ($BB_2$) is placed in the first line 73 of the buffer after $BB_1$ and in the second line 74 of the buffer. The address of the first instruction in $BB_2$ ($A_{12}$) is stored in conjunction with the second line 74. Also stored in the line buffer is the fact that the branch was taken at the end of $BB_1$, length data for both $BB_1$ and $BB_2$, and the bit/byte data (field 64 of FIG. 4).

Since the branch at the end of $BB_2$ is also taken, the CPU 21 next executes and commits to the instructions in $BB_3$. Once again since these instructions are not found in the cache memory, they are obtained from main memory 24. As shown in FIG. 8, $BB_3$ is now stored in the line 74 following $BB_2$ and in the beginning of the third line 75. The address associated with the first instruction of $BB_3$ ($A_3$) is stored in conjunction with line 75. In the currently preferred method and embodiment only two, at most, basic blocks are stored on each line of the buffer and cache memory. Moreover, each block is placed at the beginning of a line so that it may be accessed through the address of its first instruction.

As shown in FIG. 8, the instructions stored in line 73 are transferred to the cache memory. This is done once a line in the buffer has two blocks. The tag and offset fields associated of $A_1$ are moved into the tag array and the instructions in $BB_1$ and $BB_2$ are stored in fields 61 and 62, respectively referring back to FIG. 4. While not specifically shown, the bit/byte data for field 64 is also transferred from the buffer to the cache memory. The length data for $BB_1$ and $BB_2$ is now placed into fields 65 and 66. The fact that branches were taken at the end of $BB_1$ and the end of $BB_2$ is indicated in the fields 65 and 66, respectively. The next predicted address ($A_3$), the beginning address for $BB_3$ is stored in the next address field 67. Once the contents of a line in the line buffer is transferred to the cache memory, that line is cleared as shown for line 73 in FIG. 8.

Referring back to FIG. 7, if $BB_2$ had more instructions than can be stored on the line 73, the remaining instructions of $BB_2$ are stored on another line and the first address for the first byte in that other line is the next address used for field 67. In this case a flag is stored in the cache memory to indicate that a block has been separated into a plurality of lines and this information is coupled to the CPU.

Referring again to FIG. 8, after $BB_3$ is executed it is transferred to the line buffer and stored on line 74 after $BB_2$ and on line 75. Since line 74 is now filled as indicated in FIG. 9, $BB_2$ and $BB_3$ are transferred into another line in the cache memory and the address (tag and offset bits) of the first instruction of $BB_2$ ($A_{12}$) is placed in the tag array. The next address field and other data (bit/byte, branch prediction, etc.) are also transferred to the cache memory.

It should be noted from FIG. 9 that the blocks are placed into the cache memory such that the first instruction in each block is addressable. For this reason, blocks are stored twice in the array. This assures that the CPU can access a block in cache even where the branching is different than predicted.

As shown in FIG. 9, after $BB_4$ is executed it is transferred into the line 75 in a position after $BB_3$ and into the beginning of line 73. As shown in FIG. 10, $BB_3$ and $BB_4$ are transferred to the array along with the address $A_3$ and the next address $A_{12}$.

After execution of $BB_4$, the CPU will request the instruction at $A_{12}$. When it does, a hit will occur as shown in FIG. 10. This causes $BB_2$ and $BB_3$ residing in the same cache line to be coupled from the cache memory to the CPU. Following $BB_2$, the branch is not taken, although predicted to be taken, thus, $BB_3$ is discarded and $BB_5$ is next used as shown in FIG. 5B. The length data stored for $BB_2$ lets the CPU know when $BB_2$ ends and from where to discard instructions belonging to $BB_3$. The branch prediction data for the end of $BB_2$ lets the CPU know that the block that follows $BB_2$ is for the taken branch, namely $BB_3$. $BB_5$ is fetched from main memory.

As shown in FIG. 11, $BB_4$ and $BB_2$ are transferred to the cache memory along with the address for the first instruction in $BB_4$ ($A_8$) and the next address $A_{24}$. $BB_5$ as shown in FIG. 11, is transferred to line 74 and placed in a position after $BB_2$ and at the beginning of line 75. Line 73 is cleared. $BB_6$ is fetched from main memory and after execution transferred to lines 73 and lines 75 as shown in FIG. 12. When the line buffer attempts to transfer $BB_2$ and $BB_5$ to the cache memory, a hit occurs for the address $A_{12}$ since that address was previously used for the storage of $BB_2$ and $BB_3$. However, since the prediction information indicates that after the last use of $BB_2$, $BB_3$ was not used, $BB_2$ and $BB_3$ are replaced with $BB_2$ and $BB_5$. This assumes that a single bit is used for the branch prediction field which simply indicates taken or not taken. When a plurality of history bits are used $BB_2$ and $BB_3$ may not necessarily be replaced after a single execution of $BB_2$ and $BB_5$.

Constructing lines in the line buffer in the above described fashion of having two basic blocks in a line, where the second is predicted to be executed after the first, is actually accessing the predicted instructions when constructing the line and transferring it to the cache memory. In prior art caches and branch prediction mechanisms, the access of the predicted to be executed instructions is done only when the branch is encountered during execution. Thus, this new scheme saves an access each time the branch at the end of the first basic block is correctly predicted.

The process continues on as shown above. The above control flow demonstrates the manner in which the instructions are loaded into the cache memory and the manner in which they are replaced.

The benefit that can be obtained from the above-described cache memory can be appreciated if one considers what will now occur if the trace shown in FIG. 5A or some subset of it is repeated many times. For instance, each time the blocks $BB_1$ and $BB_2$ are consecutively executed, the instructions in both blocks are available to the CPU with a single access consisting of a single address being transferred to the cache memory from the CPU. If a trace of say $BB_1$, $BB_2$, $BB_3$ and $BB_4$ is repeatedly executed (in a loop), the instructions in the loop will be continuously supplied to the CPU with only a single address being sent to the cache memory. The loop is broken when the branching changes.

The precise structure discussed above need not be used. For example, if three basic blocks are to be used in each line of cache memory, then each block is placed at the beginning of each line. In this case, the line buffer will require four lines if implemented as shown above. Also, while in the presently preferred embodiment, basic blocks are identified as they are executed by the CPU, alternately part of the blocks could be identified by examining the program itself before it is supplied to the CPU.

Performance Improvement with the Invented Cache Memory

A major bottleneck of superscalar architectures is the fetch mechanism (i.e., the ability to supply multiple instructions from the correct execution path at each cycle). Complex instruction set computers (CISC) employing superscalar architectures may have the added difficulty of dealing with variable length instructions. With the fetch mechanism of the present invention where the branch prediction is an integral part of the cache memory, increased bandwidth, and more effective utilization of it, is provided which is particularly useful for superscalar processors.

The cache memory of the present invention was simulated with an out-of-order CISC superscalar processor and the performance was compared to the same out-of-order CISC model which incorporated a standard instruction cache and a standard branch target buffer (BTB). The simulations were done assuming that both caches were four-way set associative and had line lengths of 32 bytes and were used in the execution of an X86 instruction set. For small cache arrays, (e.g., up to 4K bytes) there was almost no performance difference between the standard fetch mechanism and the fetch mechanism of the present invention. This is due to the much lower hit rate in this size memory with the present invention in comparison to the standard cache. However, as the cache memory size was increased to 8–16K bytes the performance advantage of the present invention was seen. In this size range, the hit rates of a cache built in accordance of the present invention and the standard cache are both quite high and much closer. The cache of the present invention provided an advantage in performance, however, since it can supply on each cycle, instructions crossing branch boundaries without having to break the fetch of two basic blocks into two cycles which is necessary with a standard cache when there is a wait for branch prediction. Also, with the present invention, lines of cache are consumed from their start, thus supplying the maximum number of instructions a line can hold. This is not always true for a standard cache where the target address can be anywhere in the line.

The more unlimited the underlying processor, the higher the performance benefits obtained from the present invention because then the processor can consume and utilize the higher instruction bandwidth provided by the present invention. For example, when a decoder and scoreboard unit of four instructions is used, the performance advantage is twenty-five percent, when this number is doubled the performance advantage increases to thirty percent. If in comparison, the performance of an ideal fetch mechanism is observed, it can be seen that the fetch mechanism is a bottleneck in the superscalar architectures. The performance difference between the ideal fetch mechanism and the standard cache and BTB is one hundred percent. The difference between the ideal mechanism and a cache built in accordance with the present invention is only thirty-five percent.

Thus, an improved cache memory with its organization and method of operation has been described.

We claim:

1. A method of loading computer program instructions into a cache memory, said cache memory being organized by addressable lines, comprising the steps of:
   identifying basic blocks of computer program instructions such that a first instruction in each of said blocks follows a branch instruction and a last instruction in each of said blocks is a branch instruction;
   identifying a trace segment of a running computer program comprising a sequence of said basic blocks that are executed consecutively; and
   organizing storage in said cache memory by loading more than one of said basic blocks in at least one line of said cache memory in the sequence that said basic blocks occurred in said trace segment such that when the first basic block in said one line is addressed, the remaining basic blocks in said line are accessed independent of virtual address line boundaries.

2. The method defined by claim 1 including the step of storing with each basic block branch prediction data indicating whether said branch instruction of that respective basic block will be taken.

3. The method defined by claim 2 including the step of storing in said line of the cache memory the address of the first instruction of the next in said sequence of said basic blocks following the last of said basic blocks stored in said line.

4. The method defined by claim 1 wherein said line of cache memory is associated with the address of the first instruction in the first said basic blocks stored in said line of cache memory.

5. The method defined by claim 4 wherein offset bits associated with the address of the first instruction in said line of cache memory are stored with said address of said first instruction.

6. The method defined by claim 1 including the additional step of storing a long basic block in said trace segment which is too long to be stored in a single line of cache memory by partitioning said long basic block into component blocks of instructions that fit in a plurality Of said single lines of cache memory wherein first said component block of the long basic block is storm in said single line of cache memory and remaining ones of said component blocks of the long basic block is storm in one or more additional lines of said cache memory.

7. The method defined by claim 6 including the step of storing the address of the first instruction of the remaining said component block of the long basic block in said single line of cache memory.

8. In a computer system that supports speculative execution of instructions, said computer system comprising a cache memory having a plurality of lines, a main memory, and a CPU that reads a static sequence of addressable instructions from said main memory, a method of storing instructions in the cache memory, said cache memory being organized by lines, comprising the steps of:
   running a computer program so as to find committed instructions fetched from said main memory in their order of execution, said order crossing virtual address boundaries;

identifying basic blocks of said committed instructions that will be unconditionally executed in sequential order, loading only basic blocks into said lines of said cache memory after said committed instructions are unconditionally executed;

organizing storage in said cache memory by loading more than one of said basic blocks in at least one line of said cache memory so that all of the loaded basic blocks are fetched from the one line of cache memory with a single access; and associating each of said lines of cache memory by storing at least one of the basic blocks with a memory address of the first of said committed instructions in said one of the basic blocks.

9. The method defined by claim 8 wherein the association of each said line includes associating each said line with offset bits of the memory address of said fast of said committed instructions in the basic block.

10. The method defined by claim 8 including the step of dividing the basic blocks that are too long to be completely stored in a single line of cache memory into a sequence of basic block sections of said committed instructions wherein each said basic block section of said committed instructions in said sequence fits into the single line of cache memory.

11. The method defined by claim 10 including the step of storing each said basic block section in separate said single lines of cache memory.

12. The method defined by claim 11 including the step of storing the address of the first of said committed instructions of the next of said sequence of said basic block sections into said single line of cache memory.

13. The method defined by claim 8 wherein at least one of the lines of cache memory stores the memory address of the first of said committed instructions associated with another said line of cache memory which contains the basic block that is predicted to be executed next.

14. The method defined by claim 8 wherein each of the lines of cache memory stores more than one of said basic blocks where sufficient storage capacity exists in the line of cache memory and wherein each said stored basic block has a starting location in the line of cache memory.

15. The method defined by claim 14 wherein data is stored in the line of cache memory that indicates the starting location for each of the said stored basic blocks.

16. The method defined by claim 8 wherein each of the basic blocks begins with a committed instruction that follows a branch instruction and each of the basic blocks ends with a branch instruction.

17. The method defined by claim 16 wherein each said basic block is stored as a first basic block in one of the lines of cache memory.

18. The method defined by claim 17 wherein branch prediction data is stored in each line of cache memory storing said first basic block.

19. The method defined by claim 18 wherein said branch prediction data is generated as the branch instruction of each said basic block is executed and determined to be taken or not taken.

* * * * *

UNITED STATES PATENT AND TRADEMARK OFFICE
CERTIFICATE OF CORRECTION

PATENT NO.   : 5,381,533
DATED        : January 10, 1995
INVENTOR(S)  : Peleg et al.

It is certified that error appears in the above-identified patent and that said Letters Patent is hereby corrected as shown below:

In the Title page at [54] insert --BOUNDARIES-- following "LINE"

In column 6 at line 24 delete "army" and insert --array--

Signed and Sealed this

Twelfth Day of August, 1997

Attest:

BRUCE LEHMAN

*Attesting Officer*    *Commissioner of Patents and Trademarks*